(12) United States Patent
Zhang

(10) Patent No.: US 11,440,607 B2
(45) Date of Patent: Sep. 13, 2022

(54) ELECTRIC VEHICLE

(71) Applicant: NINE INTELLIGENT (CHANGZHOU) TECH CO., LTD., Jiangsu (CN)

(72) Inventor: Shengqiao Zhang, Beijing (CN)

(73) Assignee: NINE INTELLIGENT (CHANGZHOU) TECH CO., LTD., Jiangsu (CN)

( * ) Notice: Subject to any disclaimer, the term of this patent is extended or adjusted under 35 U.S.C. 154(b) by 0 days.

(21) Appl. No.: 16/495,399

(22) PCT Filed: May 8, 2019

(86) PCT No.: PCT/CN2019/085944
§ 371 (c)(1),
(2) Date: Sep. 19, 2019

(87) PCT Pub. No.: WO2020/143139
PCT Pub. Date: Jul. 16, 2020

(65) Prior Publication Data
US 2021/0403115 A1    Dec. 30, 2021

(30) Foreign Application Priority Data

Jan. 7, 2019    (CN) .......................... 201910011067.8

(51) Int. Cl.
*B62J 50/22*     (2020.01)
*B62J 3/14*      (2020.01)
(Continued)

(52) U.S. Cl.
CPC ................. *B62J 50/22* (2020.02); *B62J 3/14* (2020.02); *B62J 6/24* (2020.02); *B62J 50/225* (2020.02);
(Continued)

(58) Field of Classification Search
CPC ....................................................... B62J 50/22
See application file for complete search history.

(56) References Cited

U.S. PATENT DOCUMENTS

| 2006/0038667 | A1  |  2/2006 | Kitayama |
| 2016/0339978 | A1* | 11/2016 | Braucht ................. H05B 45/10 |
| 2016/0364982 | A1  | 12/2016 | Hamlin et al. |
| 2017/0240239 | A1* |  8/2017 | Huang .................. B60K 7/0007 |
| 2020/0410375 | A1* | 12/2020 | Seagraves ............... G01S 19/01 |

FOREIGN PATENT DOCUMENTS

| CN | 201343108 Y | 11/2009 |
| CN | 202481201 U | 10/2012 |

(Continued)

OTHER PUBLICATIONS

Corresponding KR patent search report dated May 29, 2020.
JP search result dated Jun. 1, 2021.
Corresponding EP search results dated Mar. 18, 2021.

*Primary Examiner* — Travis R Hunnings
(74) *Attorney, Agent, or Firm* — Gang Yu

(57) ABSTRACT

The present disclosure provides an electric vehicle. The electric vehicle includes: a handlebar, and an electric vehicle state indicator lamp, wherein the electric vehicle state indicator lamp is located on the handlebar of the electric vehicle, or on an upper portion of a handlebar stem of the electric vehicle, and the electric vehicle state indicator lamp is configured to indicate different vehicle states of the electric vehicle by using different display manners of the electric vehicle state indicator lamp. By adopting the above technical solution, the problem that information on various vehicle states of the electric vehicle only can be known via an instrument screen, causing a high cost and affect a visual effect and the like in the related art is solved.

13 Claims, 3 Drawing Sheets

(51) Int. Cl.
  *B62J 50/21* (2020.01)
  *B62J 6/24* (2020.01)
  *B62K 11/14* (2006.01)
  *B62M 6/40* (2010.01)
  *B62J 45/20* (2020.01)

(52) U.S. Cl.
  CPC ............... *B62K 11/14* (2013.01); *B62J 45/20* (2020.02); *B62K 2202/00* (2013.01); *B62M 6/40* (2013.01)

(56) References Cited

FOREIGN PATENT DOCUMENTS

| | | |
|---|---|---|
| CN | 202929995 U | 5/2013 |
| CN | 104290854 A | 1/2015 |
| CN | 205034274 U | 2/2016 |
| CN | 205524666 U | 8/2016 |
| CN | 108749974 A | 11/2018 |
| CN | 109649542 A | 4/2019 |
| DE | 202011109723 U1 | 2/2012 |
| JP | H08230753 A | 9/1996 |
| JP | H11227667 A | 8/1999 |
| JP | 2004200986 A | 7/2004 |
| JP | 2004243922 A | 9/2004 |
| JP | 2005-125844 A | 5/2005 |
| JP | 2017171277 A | 9/2017 |
| JP | 2018162000 A | 10/2018 |
| KR | 101250758 B1 | 4/2013 |
| RU | 2656781 C1 | 6/2018 |
| WO | 9728710 A1 | 8/1997 |
| WO | 2016045318 A1 | 3/2016 |
| WO | 2017127464 A1 | 7/2017 |
| WO | 2017167006 A1 | 10/2017 |

* cited by examiner

ELECTRIC VEHICLE

TECHNICAL FIELD

The present disclosure relates to the field of communication, and in particular to an electric vehicle.

BACKGROUND

As shown in FIG. 1, for a vehicle state of a traditional electric vehicle, indication information is provided by relying on various individual state icon symbols in an instrument for a driver to know a state change of the vehicle. However, with such a manner using a display screen, the cost is high, the various icon symbols are not enough in size, are not intuitional and are difficult to read correctly, and a majority of users need to have a long-time learning to know a vehicle state corresponding to each of the icon symbols.

In addition, in the case of riding the vehicle normally during the day, the specific icon symbols on the display screen are not seen clearly due to sunlight. Particularly, in the case of having a fast speed, if a user diverts a part of attention to identify the icon symbols on the display screen, it is very easy to occur a traffic accident.

Concerning the problem that information on the various vehicle states of the electric vehicle only can be known via an instrument screen, causing a high cost and affect a visual effect and the like in the related art, an effective solution hasn't been proposed yet.

SUMMARY

The embodiment of the present disclosure provides an electric vehicle to at least solve the problem that information on various vehicle states of the electric vehicle only can be known via an instrument screen, causing a high cost and affect a visual effect and the like in the related art.

According to an embodiment of the present disclosure, there is provided an electric vehicle, which may include: a handlebar, and an electric vehicle state indicator lamp, wherein the electric vehicle state indicator lamp is located on the handlebar of the electric vehicle, or on an upper portion of a handlebar stem of the electric vehicle, and the electric vehicle state indicator lamp is configured to indicate different vehicle states of the electric vehicle by using different display manners of the electric vehicle state indicator lamp.

In this embodiment of the present disclosure, when the electric vehicle state indicator lamp is located on the handlebar of the electric vehicle, a location of the electric vehicle state indicator lamp on the handlebar of the electric vehicle at least includes one of the followings: an inside of a handle of the electric vehicle; an outside of the handle of the electric vehicle; and a position between the inside of the handle and an instrument, wherein the instrument is located on a middle position of the handlebar of the electric vehicle.

In this embodiment of the present disclosure, one or more electric vehicle state indicator lamps are provided.

In this embodiment of the present disclosure, the electric vehicle state indicator lamp includes: an annular electric vehicle state indicator lamp, a semi-annular electric vehicle state indicator lamp, a dot array electric vehicle state indicator lamp and an elongated electric vehicle state indicator lamp.

In this embodiment of the present disclosure, the different display manners at least include one of the followings: different display colors of the electric vehicle state indicator lamp; different numbers of powered-on electric vehicle state indicator lamps when a plurality of electric vehicle state indicator lamps are provided; and different display shapes of the electric vehicle state indicator lamp.

In this embodiment of the present disclosure, the different vehicle states at least include one of the followings: a ridden state of the electric vehicle, a stand-by state of the electric vehicle, a faulty state of the electric vehicle, a Bluetooth connection state of the electric vehicle and a charging state of the electric vehicle.

In this embodiment of the present disclosure, the electric vehicle may further include: a sound production apparatus, and the sound production apparatus is configured to make different types of prompt tones for the different vehicle states.

In this embodiment of the present disclosure, the electric vehicle may further include: a processing module; the processing module is respectively connected to the electric vehicle state indicator lamp and the sound production apparatus; and the processing module is configured to control, after the determination of a vehicle state of the electric vehicle, at least one of the following state information of the electric vehicle: a display manner of the electric vehicle state indicator lamp of the electric vehicle, and a prompt tone made by the electric vehicle.

In this embodiment of the present disclosure, the processing module is further configured to receive instruction information sent by a mobile terminal, wherein the instruction information is generated based on an operation performed on a client of the mobile terminal, the instruction information is used for indicating a corresponding relationship between vehicle states and state information, different state information corresponds to different vehicle states, and the mobile terminal is connected to the electric vehicle via Bluetooth.

In this embodiment of the present disclosure, the processing module is further configured to receive, when the vehicle state indicates that the electric vehicle is in a faulty state and the mobile terminal is connected to the electric vehicle via the Bluetooth, receive a fault type of the electric vehicle and a solution corresponding to the fault type which are sent after the mobile terminal tests the electric vehicle, and a solution corresponding to the fault type.

With the present disclosure, the electric vehicle state indicator lamp is set on the electric vehicle, the electric vehicle state indicator lamp is located on the handlebar of the electric vehicle, or on the upper portion of the handlebar stem of the electric vehicle, and the electric vehicle state indicator lamp is configured to indicate the different vehicle states of the electric vehicle by using the different display manners of the electric vehicle state indicator lamp. By adopting the above technical solutions, the problem that the information on the various vehicle states of the electric vehicle only can be known via the instrument screen, causing the high cost, affect the visual effect and the like in the related art is solved; the information on the vehicle state of the electric vehicle can be known without an instrument; and therefore, a user is convenient to view the various vehicle states of the electric vehicle, the arrangement of the instrument panel is simplified and the cost is reduced.

BRIEF DESCRIPTION OF THE DRAWINGS

The accompanying drawings are described here to provide a deeper understanding of the present disclosure. The schematic embodiments and description of the present disclosure are adopted to explain the present disclosure, and do not form improper limits to the present disclosure. In the drawings.

DETAILED DESCRIPTION OF THE EMBODIMENTS

The present disclosure is described below with reference to the drawings and embodiments in detail. It should be noted that the embodiments of the present disclosure and the characteristics of the embodiments may be combined with each other if there is no conflict.

It is to be noted that, terminologies such as "first" and "second" in the specification, claims and accompanying drawings of the present disclosure are only used to distinguish similar objects, rather than to describe a special order or a precedence order.

The technical solutions in the embodiments of the present disclosure are mainly described by taking an electric vehicle as an executor. With the technical solutions of controlling a display state of an electric vehicle state indicator lamp of the electric vehicle by the electric vehicle, and controlling the display state of the electric vehicle state indicator lamp of the electric vehicle and a prompt tone made by the electric vehicle, etc., the condition in which various vehicle states of the electric vehicle only can be known via an instrument in the conventional art is prevented. Hereinafter, the control process of the electric vehicle will be described in combination with the embodiments 1-3.

Embodiment 1

Figure 1:
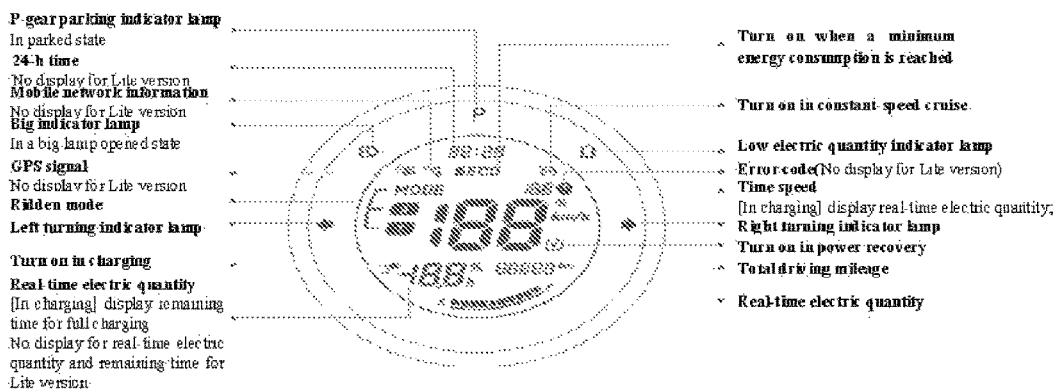
FIG. 1 is a display schematic diagram of an instrument of an electric vehicle in the related art.
Figure 2:
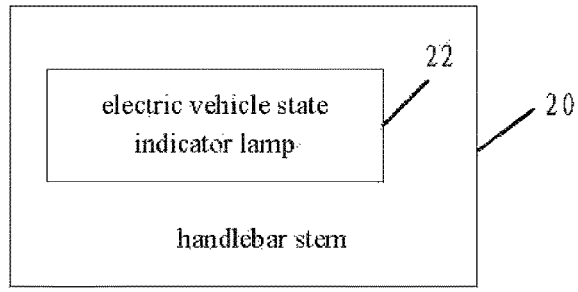
FIG. 2 is a structural block diagram of an electric vehicle according to an embodiment of the present disclosure.

An embodiment of the present disclosure provides an electric vehicle. FIG. 2 is a structural block diagram of an electric vehicle according to an embodiment of the present disclosure. As shown in FIG. 2, the electric vehicle may include: a handlebar 20 and an electric vehicle state indicator lamp 22.

The electric vehicle state indicator lamp is located on the handlebar of the electric vehicle (e.g., the electric vehicle state indicator lamp 22 is located on the handlebar 20 in FIG. 2), or on an upper portion of a handlebar stem of the electric vehicle, and the electric vehicle state indicator lamp is configured to indicate different vehicle states of the electric vehicle by using different display manners.

With the above technical solutions, the electric vehicle state indicator lamp is set on the electric vehicle, the electric vehicle state indicator lamp is located on the handlebar of the electric vehicle, or on the upper portion of the handlebar stem of the electric vehicle, and the electric vehicle state indicator lamp is configured to indicate the different vehicle states of the electric vehicle by using the different display manners of the electric vehicle state indicator lamp. By adopting the above technical solutions, the problem that the information on the various vehicle states of the electric vehicle only can be known via an instrument screen, causing a high cost, affect a visual effect and the like in the related art is solved; the information on the vehicle state of the electric vehicle can be known without an instrument; and therefore, a user is convenient to view the various vehicle states of the electric vehicle, the arrangement of the instrument panel is simplified and the cost is reduced.

In this embodiment of the present disclosure, when the electric vehicle state indicator lamp is located on the handlebar of the electric vehicle, a location of the electric vehicle state indicator lamp on the handlebar of the electric vehicle at least one of the following positions of the electric vehicle: an inside of a handle of the electric vehicle; an outside of the handle of the electric vehicle; and a position between the inside of the handle and an instrument, wherein the instrument is located on a middle position of the handlebar of the electric vehicle. The electric vehicle state indicator lamp may further be located on a side position of the instrument, which is not limited by this embodiment of the present disclosure thereto.

In this embodiment of the present disclosure, one or more electric vehicle state indicator lamps are provided.

In this embodiment of the present disclosure, the electric vehicle state indicator lamp includes: an annular electric vehicle state indicator lamp, a semi-annular electric vehicle state indicator lamp, a dot array electric vehicle state indicator lamp and an elongated electric vehicle state indicator lamp.

In this embodiment of the present disclosure, the different display manners at least include one of the followings: different display colors of the electric vehicle state indicator lamp; different numbers of powered-on electric vehicle state indicator lamps when a plurality of electric vehicle state indicator lamps are provided; and different display shapes of the electric vehicle state indicator lamp. For example, if an annular electric vehicle state indicator lamp is provided, the bright upper semi-annular represents a first vehicle state, the bright lower semi-annular represents a second vehicle state and the whole bright annular represents a third vehicle state, which is limited by this embodiment of the present disclosure thereto.

In this embodiment of the present disclosure, the different vehicle states at least include one of the followings: a ridden state of the electric vehicle, a stand-by state of the electric vehicle, a faulty state of the electric vehicle, a Bluetooth connection state of the electric vehicle and a charging state of the electric vehicle.

Figure 3:
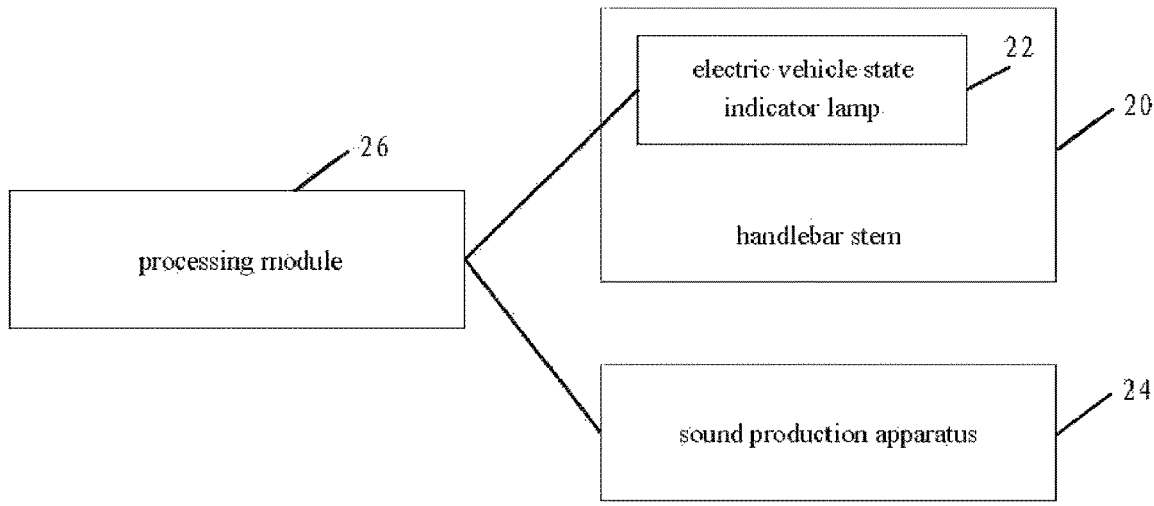
FIG. 3 is another structural block diagram of an electric vehicle according to an embodiment of the present disclosure.

As shown in FIG. 3, in an optional embodiment, the electric vehicle may further include: a sound production apparatus 24; and the sound production apparatus 24 is configured to make different types of prompt tones for the different vehicle states.

As shown in FIG. 3, in an optional embodiment, the electric vehicle may further include: a processing module 26; the processing module 26 is respectively connected to the electric vehicle state indicator lamp 22 and the sound production apparatus 24; and the processing module 26 is configured to control, after the determination of a vehicle state of the electric vehicle, at least one of the following state information of the electric vehicle: a display manner of the electric vehicle state indicator lamp of the electric vehicle, and a prompt tone made by the electric vehicle.

In this embodiment of the present disclosure, the processing module 26 is further configured to receive instruction information sent by a mobile terminal, wherein the instruction information is generated based on an operation performed on a client of the mobile terminal, the instruction information is used for indicating a corresponding relationship between vehicle states and state information, different state information corresponds to different vehicle states, and the mobile terminal is connected to the electric vehicle via Bluetooth.

In this embodiment of the present disclosure, the processing module 26 is further configured to receive, when the vehicle state indicates that the electric vehicle is in a faulty state and the mobile terminal is connected to the electric vehicle via the Bluetooth, receive a fault type of the electric vehicle and a solution corresponding to the fault type which are sent after the mobile terminal tests the electric vehicle.

It is to be noted that FIGS. 2-3 only indicate each component included in the electric vehicle and are not intended to limit a positional relationship of each component on the electric vehicle. For example, the processor may further be located on the handlebar, or is integrated with the sound production apparatus into a module, which is not limited by this embodiment of the present disclosure thereto.

The structure of the electric vehicle and the application process of the electric vehicle will be described below in combination with exemplary embodiments.

Exemplary Embodiment 1

Figure 4:
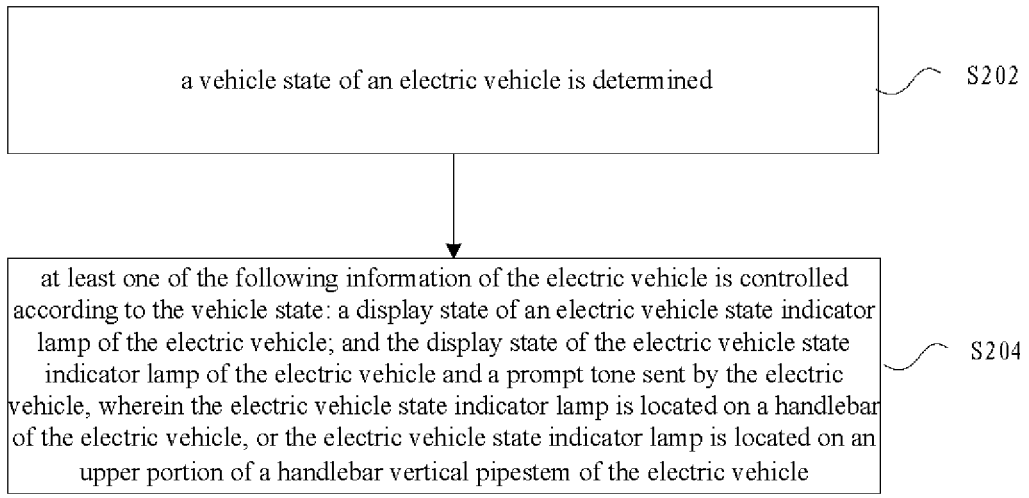
FIG. 4 is a flowchart diagram of a method of controlling an electric vehicle according to an embodiment of the present disclosure.

The embodiment of the present disclosure provides a method of controlling an electric vehicle. FIG. 4 is a flowchart diagram of a method of controlling an electric vehicle according to an embodiment of the present disclosure. As shown in FIG. 4, the controlling method may include the following steps.

In step S202, a vehicle state of an electric vehicle is determined.

In step S204, at least one of the following information of the electric vehicle is controlled according to the vehicle state: a display state of an electric vehicle state indicator lamp of the electric vehicle; and the display state of the electric vehicle state indicator lamp of the electric vehicle and a prompt tone made by the electric vehicle, wherein the electric vehicle state indicator lamp is located on a handlebar of the electric vehicle, or on an upper portion of a handlebar stem of the electric vehicle.

It is to be noted that the electric vehicle state indicator lamp in the following embodiments and exemplary embodiments of the present disclosure may indicate various vehicle states of the electric vehicle only via a change in own display states.

In an optional embodiment, the display state of the electric vehicle state indicator lamp of the electric vehicle is controlled according to the vehicle state, which the vehicle state may at least includes one of the followings.

1) The display color of the electric vehicle state indicator lamp is controlled according to the vehicle state, i.e., the different vehicle states may be represented by different display colors.

2) When a plurality of electric vehicle state indicator lamps are provided, different numbers of powered-on electric vehicle state indicator lamps is controlled according to the vehicle state, i.e., different numbers of powered-on the electric vehicle state indicator lamps indicate the different vehicle states.

The display state of the electric vehicle state indicator lamp of the electric vehicle and the prompt tone made by the electric vehicle are controlled according to the vehicle state, which may at least include one of the followings.

1) The display color of the electric vehicle state indicator lamp, and the prompt tone made by the electric vehicle and corresponding to the vehicle state are controlled according to the vehicle state, i.e., the different vehicle states are indicated by different displaying colors; and meanwhile, the different vehicle states are indicated in cooperation with different types of prompt tones made by the electric vehicle.

2) When a plurality of electric vehicle state indicator lamps are provided, t different numbers of powered-on electric vehicle state indicator lamps, and the prompt tone made by the electric vehicle and corresponding to the vehicle state are controlled according to the vehicle state, i.e., different display numbers of the electric vehicle state indicator lamps are notified to the electric vehicle to make different prompt tones.

It is to be noted that, for different vehicle states, what control operation executed by the electric vehicle may be set by a mobile terminal in Bluetooth connection with the electric vehicle. A specified APP client will be downloaded on the mobile terminal, and the electric vehicle receives instruction information sent by the mobile terminal, wherein the instruction information is generated based on an operation performed on the client of the mobile terminal, the instruction information is used for indicating a corresponding relationship between vehicle states and state information, and different state information corresponds to different vehicle states.

In this embodiment of the present disclosure, when a fault of the electric vehicle is determined according to the vehicle state, if a Bluetooth function of the electric vehicle is still normal, the electric vehicle may receive the detection of the client of the mobile terminal, and acquires a fault type of the electric vehicle and a solution corresponding to the fault type, wherein the fault type is detected by the client of the mobile terminal. If the Bluetooth function of the electric vehicle is also faulty, a user needs to make a call or send a short message independently to contact a customer service staff or a sales staff to notify a current fault condition of the electric vehicle, thus acquiring a repair solution of the electric vehicle.

It is to be noted that the different vehicle states in this embodiment of the present disclosure at least include one of the followings: a ridden state of the electric vehicle, a stand-by state of the electric vehicle, a faulty state of the electric vehicle, a Bluetooth connection state of the electric vehicle and a charging state of the electric vehicle.

Exemplary Embodiment 2

Figure 5:
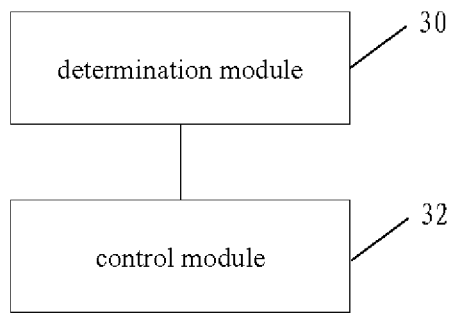
FIG. 5 is a first another structural block diagram of an electric vehicle according to an embodiment of the present disclosure.

The embodiment of the present disclosure further provides an electric vehicle. FIG. 5 is first structural block diagram of an electric vehicle according to an embodiment of the present disclosure. As shown in FIG. 5, the electric vehicle may include: a determination module 30 and a control module 32.

The determination module 30 is configured to determine a vehicle state of the electric vehicle.

The control module 32 is configured to control at least one of the following information of the electric vehicle according to the vehicle state: a display state of an electric vehicle state indicator lamp of the electric vehicle; and a prompt tone made by the electric vehicle, wherein the electric vehicle state indicator lamp is located on a handlebar of the electric vehicle, or on an upper portion of a handlebar stem of the electric vehicle.

Through the present disclosure, after the determination of the vehicle state of the electric vehicle, at least one of the following information of the electric vehicle is controlled according to the vehicle state: the display state of the electric vehicle state indicator lamp of the electric vehicle; and the display state of the electric vehicle state indicator lamp of the electric vehicle and the prompt tone made by the electric vehicle wherein the electric vehicle state indicator lamp is located on the handlebar of the electric vehicle, or on the upper portion of the handlebar stem of the electric vehicle, so that the information on the vehicle state of the electric vehicle can be known without an instrument; and therefore, a user is convenient to view the various vehicle states of the electric vehicle, the arrangement of the instrument panel is simplified and the cost is reduced.

In at least one exemplary embodiment, the control module 32 is configured to control a display color of the electric vehicle state indicator lamp according to the vehicle state; and/or control a number of powered-on electric vehicle state indicator lamps according to the vehicle state when a plurality of electric vehicle state indicator lamps are provided.

In at least one exemplary embodiment, the control module 32 is further configured to control, according to the vehicle state, the display color of the electric vehicle state indicator lamp and the electric vehicle to make a prompt tone type corresponding to the vehicle state; and/or control, according to the vehicle state, the number of powered-on the electric vehicle state indicator lamps when a plurality of electric vehicle state indicator lamps are provided and the electric vehicle to make a prompt tone type corresponding to the vehicle state.

Figure 6:
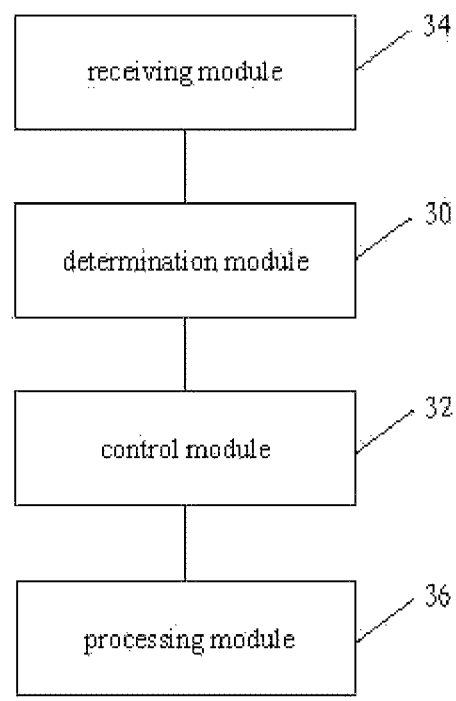
FIG. 6 is a second structural block diagram of an electric vehicle according to an embodiment of the present disclosure.

FIG. 6 is a second structural block diagram of an electric vehicle according to an embodiment of the present disclosure. As shown in FIG. 6, the electric vehicle may include: a receiving module 34.

The processing module 34 is configured to receive instruction information sent by a mobile terminal, wherein the instruction information is generated based on an operation performed on a client of the mobile terminal, the instruction information is used for indicating a corresponding relationship between vehicle states and state information, different state information corresponds to different vehicle states, and the mobile terminal is connected to the electric vehicle via Bluetooth.

As shown in FIG. 6, the electric vehicle may further include: a processing module 36.

The processing module 36 (also equivalent to the processing module 26 in the above embodiment) is configured to receive, when the vehicle state indicates that the electric vehicle is in a faulty state and the mobile terminal is in Bluetooth connection with the electric vehicle, detection of the client of the mobile terminal, and acquire a fault type of the electric vehicle detected by the client of the mobile terminal and a solution corresponding to the fault type.

Exemplary Embodiment 2

Figure 7:
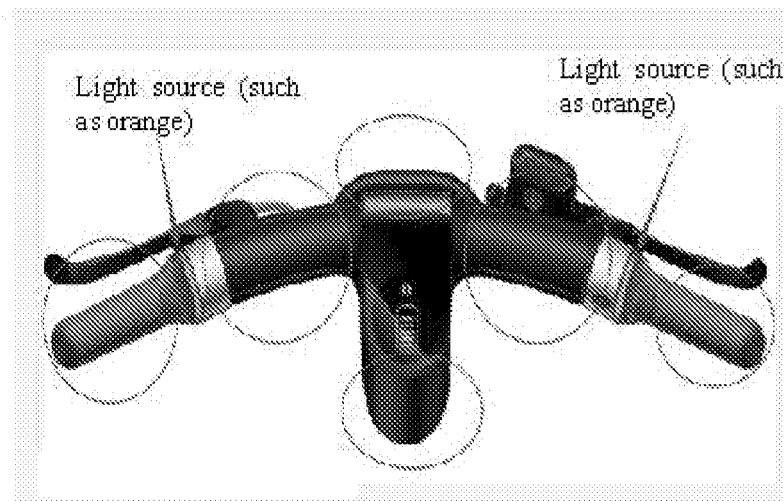
FIG. 7 is a schematic diagram of an application of an electric vehicle state indicator lamp according to an embodiment of the present disclosure.

As shown in FIG. 7, light sources (hereinafter referred to as "electric vehicle state indicator lamps", equivalent to the electric vehicle state indicator lamps in the above embodiments) are designed in conspicuous areas on two sides of the handle to display different colors (or in cooperation with corresponding prompt tones made by a vehicle body) to represent various states of the vehicle, thus facilitating the memory of a user and reducing the cost of the electric vehicle.

1. The electric vehicle is in a ridden state (the electric vehicle is powered on, an accelerator shifter is in an activated state and the electric vehicle may be ridden normally): the electric vehicle state indicator lamps on the two sides display corresponding colors all the time (e.g., the default is white); and when the electric vehicle is just switched to the ridden state, there is a corresponding voice prompt (such as a "bang" sound).

2. The electric vehicle is in a stand-by state (the electric vehicle is powered on, an accelerator shifter is in a non-use state and the electric vehicle cannot be ridden normally): the electric vehicle state indicator lamps on the two sides display corresponding colors all the time (e.g., the default is orange); and when the electric vehicle is just switched to the stand-by state, there is a corresponding voice prompt (such as two "bang bang" sounds).

3. The electric vehicle is in a faulty state (the electric vehicle is powered on, a vehicle electrical controlled system has a fault and the electric vehicle cannot be used normally): the electric vehicle state indicator lamps on the two sides display corresponding colors all the time (e.g., the default is red); and meanwhile, corresponding continuous sound prompts (such as continuous "bang bang bang" sounds) are accompanied.

A Red Green Blue (RGB) three-primary-color manner is adopted by the color of the electric vehicle state indicator lamp, and different vehicle states may be set by an APP client of a mobile terminal to display different own favorite colors, so that the interaction between the user and the electric vehicle is implemented and the better experience is provided for the user.

Based on the above technical solutions, as the electric vehicle state indicator lamp displays different colors (or the vehicle body makes corresponding prompt tones cooperatively at the same time) as identification signals for different states of the vehicle, the user is very intuitional and convenient to identify various states of the electric vehicle, so that the learning cost of the user is reduced and the safety of the user in a driving process is improved; and therefore, the complexity of the display screen of the instrument is reduced, the size of the display screen is reduced, and the manufacturing cost is greatly decreased.

In at least one exemplary embodiment, the specific examples in this embodiment may be referred to the examples described in the above embodiment and optional implementation manners and will not be repeated in this embodiment.

It is apparent that those skilled in the art should know that each module or each step of the present disclosure may be implemented by a universal computing device, and the modules or steps may be concentrated on a single computing device or distributed on a network formed by a plurality of computing devices, and may optionally be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. Therefore, the present disclosure is not limited to any specific hardware and software combination.

The above are only the exemplary embodiments of the present disclosure and are not intended to limit the scope of protection of the present disclosure. For those skilled in the art, the present disclosure may have various modifications and variations. Any modifications, equivalent replacements, improvements and the like made within the principle of the present disclosure shall fall within the scope of protection of the present disclosure.

What is claimed is:

1. An electric vehicle, comprising: a handlebar and an electric vehicle state indicator lamp, wherein
the electric vehicle state indicator lamp is located on the handlebar of the electric vehicle or on an upper portion of a handlebar stem of the electric vehicle, and the electric vehicle state indicator lamp is configured to indicate different vehicle states of the electric vehicle by using different display manners of the electric vehicle state indicator lamp, wherein the electric vehicle further comprises: a processing module; the processing module is respectively connected to the electric vehicle state indicator lamp and a sound production apparatus; and the processing module is configured to control, after the determination of a vehicle state of the electric vehicle, at least one of the following state information of the electric vehicle: a display manner of the electric vehicle state indicator lamp of the electric vehicle, and a prompt tone made by the electric vehicle, wherein the processing module is further configured to receive, when the vehicle state indicates that the electric vehicle is in a faulty state and the mobile terminal is connected to the electric vehicle via the Bluetooth, receive a fault type of the electric vehicle and a solution corresponding to the fault type which are sent after the mobile terminal tests the electric vehicle.

2. The electric vehicle as claimed in claim 1, wherein when the electric vehicle state indicator lamp is located on the handlebar of the electric vehicle, a location of the electric vehicle state indicator lamp on the handlebar of the electric vehicle at least comprises one of the followings:
an inside of a handle of the electric vehicle;
an outside of the handle of the electric vehicle; and
a position between the inside of the handle and an instrument, wherein the instrument is located on a middle position of the handlebar of the electric vehicle.

3. The electric vehicle as claimed in claim 1, wherein one or more electric vehicle state indicator lamps are provided.

4. The electric vehicle as claimed in claim 1, wherein the electric vehicle state indicator lamp comprises: an annular electric vehicle state indicator lamp, a semi-annular electric vehicle state indicator lamp, a dot array electric vehicle state indicator lamp and an elongated electric vehicle state indicator lamp.

5. The electric vehicle as claimed in claim 1, wherein the different display manners at least comprise one of the followings: different display colors of the electric vehicle state indicator lamp; different numbers of powered-on electric vehicle state indicator lamps when a plurality of electric vehicle state indicator lamps are provided; and different display shapes of the electric vehicle state indicator lamp.

6. The electric vehicle as claimed in claim 1, wherein the different vehicle states at least comprise one of the followings: a ridden state of the electric vehicle, a stand-by state of the electric vehicle, a faulty state of the electric vehicle, a Bluetooth connection state of the electric vehicle and a charging state of the electric vehicle.

7. The electric vehicle as claimed in claim 1, wherein the electric vehicle further comprises: a sound production apparatus, and the sound production apparatus is configured to make different types of prompt tones for the different vehicle states.

8. The electric vehicle as claimed in claim 1, wherein the processing module is further configured to receive instruction information sent by a mobile terminal, wherein the instruction information is generated based on an operation performed on a client of the mobile terminal, the instruction information is used for indicating a corresponding relationship between vehicle states and state information, different state information corresponds to different vehicle states, and the mobile terminal is connected to the electric vehicle via Bluetooth.

9. The electric vehicle as claimed in claim 2, wherein one or more electric vehicle state indicator lamps are provided.

10. The electric vehicle as claimed in claim 2, wherein the electric vehicle state indicator lamp comprises: an annular electric vehicle state indicator lamp, a semi-annular electric vehicle state indicator lamp, a dot array electric vehicle state indicator lamp and an elongated electric vehicle state indicator lamp.

11. The electric vehicle as claimed in claim 2, wherein the different display manners at least comprise one of the followings: different display colors of the electric vehicle state indicator lamp; different numbers of powered-on electric vehicle state indicator lamps when a plurality of electric vehicle state indicator lamps are provided; and different display shapes of the electric vehicle state indicator lamp.

12. The electric vehicle as claimed in claim 2, wherein the different vehicle states at least comprise one of the followings: a ridden state of the electric vehicle, a stand-by state of the electric vehicle, a faulty state of the electric vehicle, a Bluetooth connection state of the electric vehicle and a charging state of the electric vehicle.

13. The electric vehicle as claimed in claim 2, wherein the electric vehicle further comprises: a sound production apparatus, and the sound production apparatus is configured to make different types of prompt tones for the different vehicle states.

* * * * *